United States Patent
Torrini

(10) Patent No.: US 7,930,046 B2
(45) Date of Patent: Apr. 19, 2011

(54) CODEC INTEGRATED CIRCUIT, CODEC AND METHODS FOR USE THEREWITH

(75) Inventor: Antonio Torrini, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1226 days.

(21) Appl. No.: 11/365,231

(22) Filed: Mar. 1, 2006

(65) Prior Publication Data

US 2007/0206489 A1  Sep. 6, 2007

(51) Int. Cl.
*G06F 17/00* (2006.01)
(52) U.S. Cl. ............ 700/94; 381/81; 381/85; 381/94.5
(58) Field of Classification Search ............ 370/203; 700/94; 704/258; 341/110; 381/26, 81, 381/85, 94.5, 306
See application file for complete search history.

(56) References Cited

U.S. PATENT DOCUMENTS

| | | | |
|---|---|---|---|
| 6,259,957 B1 * | 7/2001 | Alexander et al. | 700/94 |
| 7,034,569 B1 * | 4/2006 | Balasubramanian et al. | 326/38 |
| 2003/0023329 A1 * | 1/2003 | Brooks et al. | 700/94 |
| 2004/0189272 A1 * | 9/2004 | Matsuura et al. | 323/283 |

OTHER PUBLICATIONS

Audio Codec '97, Revision 2.3 Revision 1.0, Intel, Apr. 2002.*

* cited by examiner

*Primary Examiner* — Vivian Chin
*Assistant Examiner* — Friedrich Fahnert

(57) ABSTRACT

A codec includes an output module for converting a digital input signal into an analog output signal. A controller module monitors a plurality of status conditions and asserts a mute signal for engaging an output mute switch based on a plurality of disconnect rules.

42 Claims, 13 Drawing Sheets

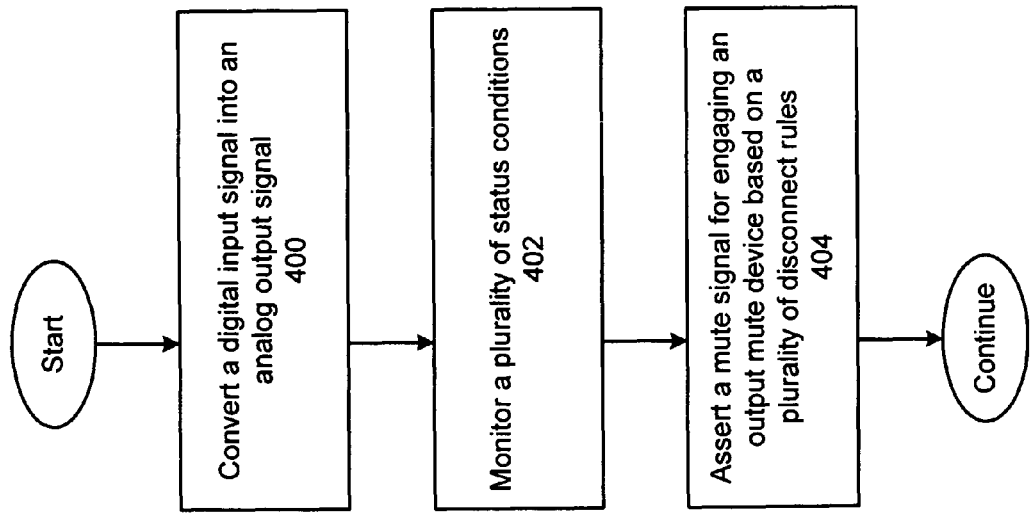

ial view of a computer in accordance with an embodiment of the present invention.

CODEC INTEGRATED CIRCUIT, CODEC AND METHODS FOR USE THEREWITH

BACKGROUND OF THE INVENTION

1. Technical Field of the Invention

The present invention relates to codecs such as audio and video codecs that can be implemented on integrated circuits and related methods.

2. Description of Related Art

As is known, codecs are used in a wide variety of electronic devices that process real-time signals such as audio and/or video signals. Such devices include laptop, notebook and other personal computers, personal digital assistants (PDA), compact disk (CD) players, Motion Picture Experts Group (MPEG3) or (MP3) players, digital video disk (DVD) players, amplitude modulation/frequency modulation (AM/FM) radios, satellite radios, cellular telephones, etc. As an example, a computer may include an audio codec integrated circuit to support the processing of audio signals in order to produce an audio output that is delivered to the user through speakers, headphones or the like and a video codec for playing streaming video or DVD video content on the computer's display screen.

Various conditions can occur that can cause an undesirable transient signal on the output of a codec. Some prior art codecs include an external digital signal processor that controls a switch to disconnect the codec output based on conditions detectable by the external digital signal processor. A need exists for improved designs that provide greater functionality and that can be efficiently implemented, particularly in an integrated circuit.

BRIEF DESCRIPTION OF THE SEVERAL VIEWS OF THE DRAWINGS

FIG. 8 presents a flowchart representation of a method in accordance with the present invention.

DETAILED DESCRIPTION OF THE INVENTION INCLUDING THE PRESENTLY PREFERRED EMBODIMENTS

Figure 1:
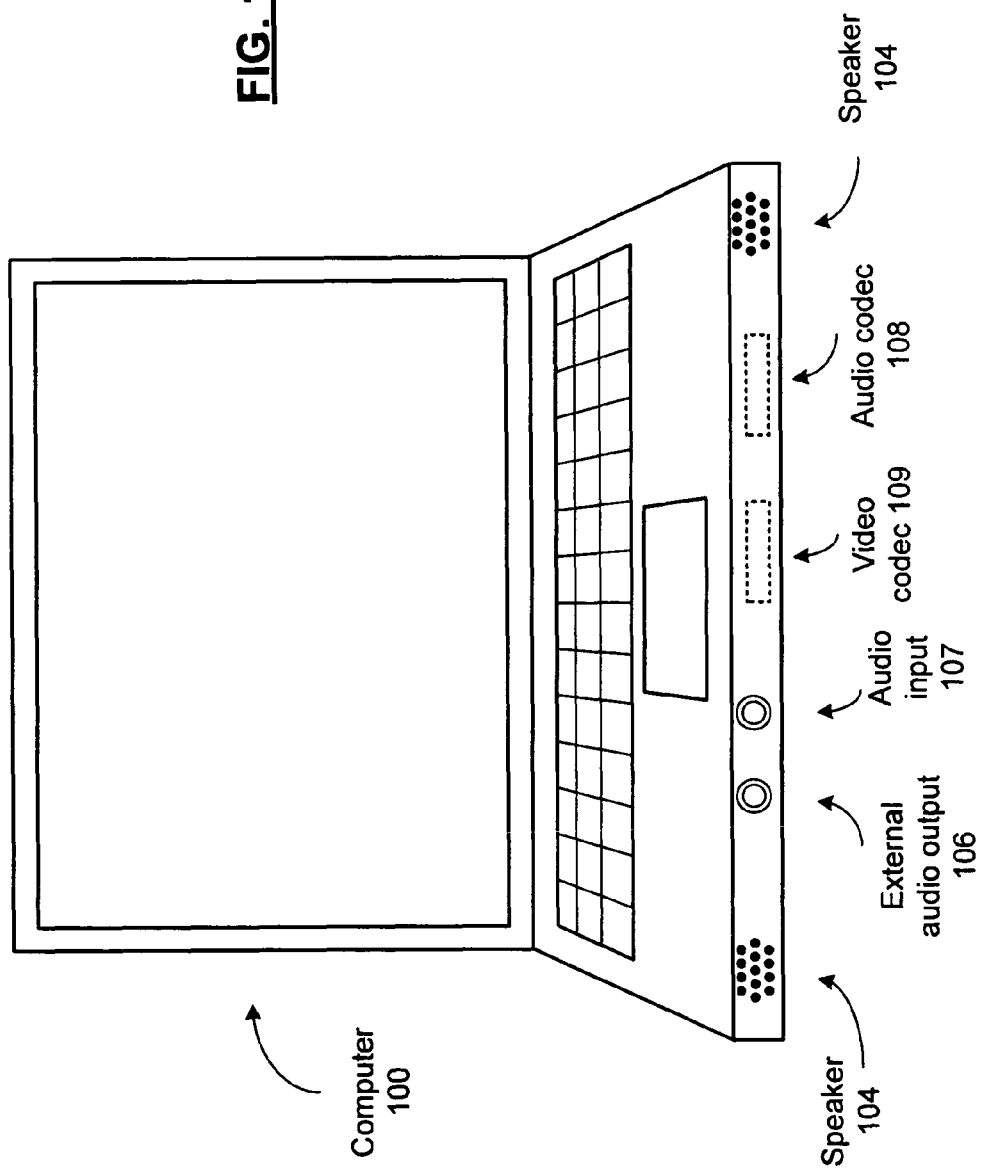
FIG. 1 presents a pictorial view of a computer in accordance with an embodiment of the present invention.

FIG. 1 presents a pictorial view of a computer in accordance with an embodiment of the present invention. In particular, computer 100 includes integrated speakers 104 for converting audio signals, derived from streaming audio, stored audio files such as MP3 files or other audio file formats, or played from a compact disk, that are processed by audio codec 108 into an audio output. In addition, computer 100 includes an audio input 107, such as an input jack for receiving audio input signals from external devices, external audio output 106 such as an output jack, for coupling an audio signal to external audio devices such as external speakers, a stereo system or other devices that reproduce, process or store audio signals.

Further, computer 100 includes a video codec 109 for processing video signals derived from streaming video, stored video files in a digital video format such as MPEG1, MPEG2, MPEG4 or other digital video format, or played from a DVD for display on the display screen of computer 100.

Audio codec 108 and/or video codec 109 include various features and functions in accordance with the present invention that will be described in conjunction with the figures that follow.

Figure 2:
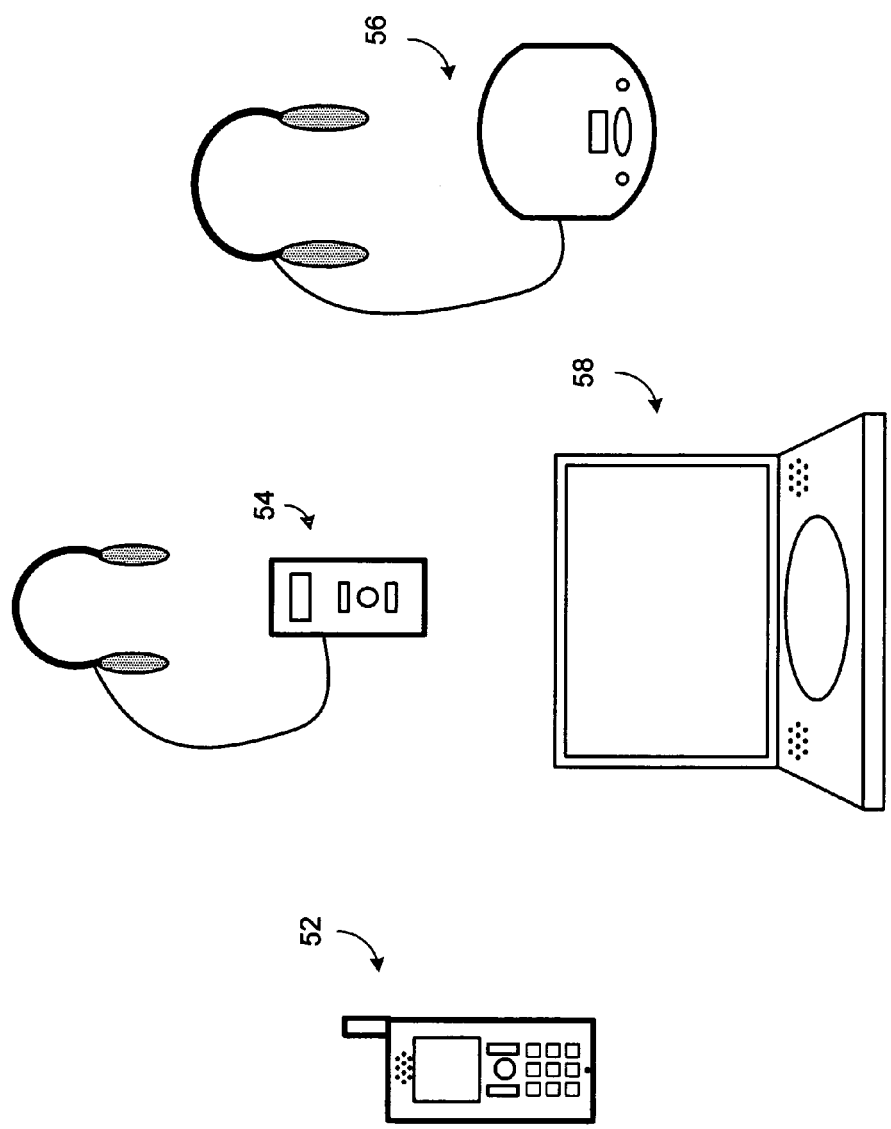
FIG. 2 presents a pictorial view of various electronic devices in accordance with embodiments of the present invention.

FIG. 2 presents a pictorial view of various electronic devices in accordance with embodiments of the present invention. While the audio codec 108 and video codec 109 have been described in conjunction with its use in a computer such as computer 100, audio codec 108 and/or video codec 109 may likewise be incorporated in a cellphone 52, handheld audio/video device 54, compact disk player 56 and/or digital video disk play 58 along with other audio and video devices, and other electronic devices that process audio and/or signals to provide an audio output or video display.

Figure 3:
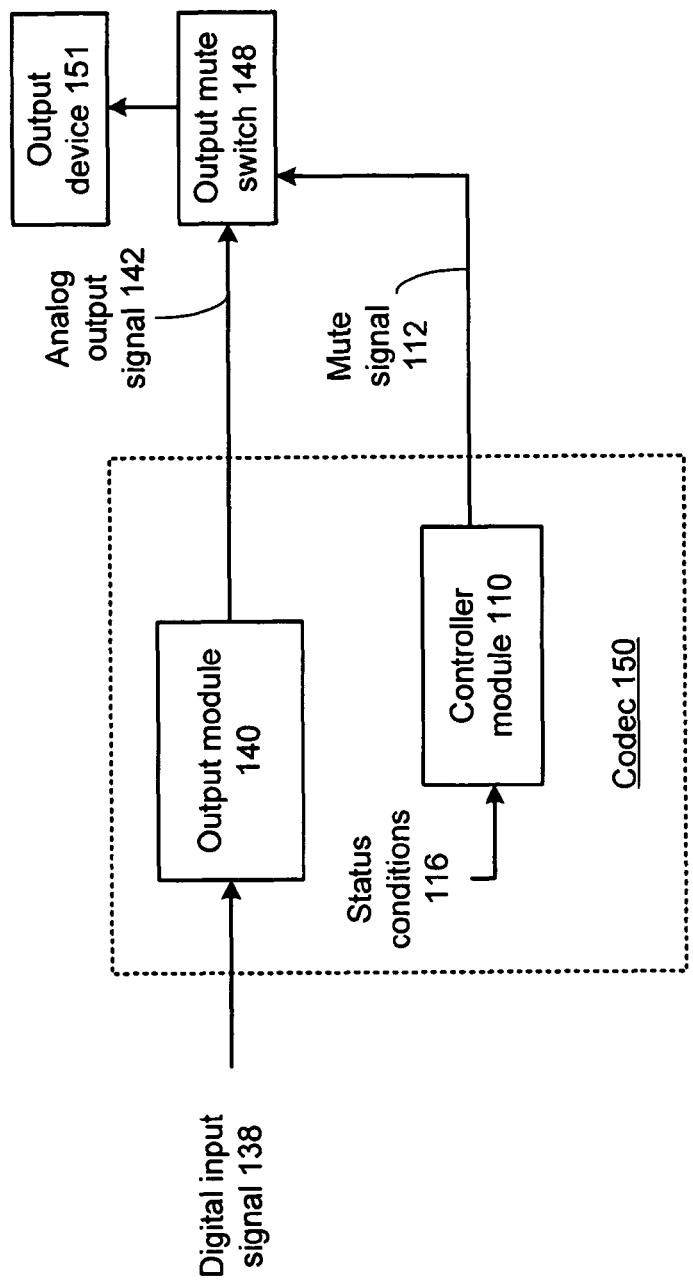
FIG. 3 presents a block diagram representation of a codec in accordance with an embodiment of the present invention.

FIG. 3 presents a block diagram representation of a codec in accordance with an embodiment of the present invention. In particular, a codec 150 is presented, such as audio codec 108 or video codec 109, that includes an output module 140 for converting a digital input signal 138 into an analog output signal 142. Controller module 110 monitors a plurality of status conditions 116 and asserts a mute signal 112 for engaging an output mute switch 148 based on a plurality of disconnect rules. In particular, output mute switch 148 disconnects or otherwise disables the input to output device 151 when the mute signal 112 is asserted.

In an embodiment of the present invention, controller module 110 can be implemented using a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Further, while controller module 110 performs various functions associated with asserting the mute signal 112 in accordance with the present invention, controller module 110 may also provide additional functionality for the control of codec 150, the reception, buffering and processing of digital input signal 138, and other functions and features of codec 150 that are capable of being performed by a general processing module and are within the capabilities of the particular device chosen to implement controller module 110.

In an embodiment of the present invention, codec 150 is an audio codec such as codec 108 and digital input signal 138 is an audio signal that includes a sequence of 24-bit samples of an audio signal at a sampling frequency such as 44.1 kHz, and pulse code modulated. However, digital input signal 138 can include an audio signal of other formats such as Alesis digital audio tape (ADAT) or Sony/Philips Digital InterFace (S/PDIF) and other formats with greater or lesser bit accuracy such as 16 bits or 32 bits, other modulation schemes and differing sample frequencies. In an embodiment of the present invention, codec 150 is a video codec such as video codec 109 and real-time signal 110 is a video signal.

In an embodiment of the present invention, output device 151 includes one or more speakers, headphones, earbuds or other audio reproduction devices. Alternatively, output device 151 includes a video display device such as a cathode ray tube (CRT), liquid crystal display (LCD), plasma display, including rear or front projection units or other video display device.

In an embodiment, output mute switch 148 includes an output mute device such as a relay, analog switch, transistor or other switching element for disconnecting analog output signal 142 or a downstream output from a device responsive to analog output signal 142, from output device 151. In an alternative embodiment of the present invention output mute switch 148 includes an output mute device that attenuates arialog output signal 142 or a downstream signal based on analog output signal 142, either completely or partially by adjusting a gain, adjusting one or more filter coefficients or to otherwise attenuate, modify or disable any of these output signals.

In operation, controller module 110 can monitor a plurality of status conditions 116 that are generated locally by codec 150 or received from one or more external devices. In an embodiment of the present invention, the status conditions 116 are monitored based on a plurality of disconnect rules that indicate a potential interruption in analog output signal 142 or the potential production of an undesirable transient in analog output signal 142 that could be undesirable to present to the user through output device 151. When one of a plurality of disconnect rules are met, the mute signal 112 is asserted to avoid or attenuate the production of an audio and/or video output during these circumstances.

In an embodiment of the present invention, mute signal 112 causes a temporary engagement of output mute switch 148 for either a predetermined minimum time period, such as a time period based on the response time of the output mute switch 148, for the duration that the particular disconnect rule is met, or until some additional condition is satisfied. In a further embodiment, the amount of predetermined minimum time can vary based on the particular conditions and/or the particular disconnect rules that mute signal 112 to be asserted. For instance, if the input format or input source of digital input signal is changed, mute signal 112 can be engaged for a time period calculated to be slightly greater than the anticipated settling time of the output module 140 in response to such a change. Further, if a reset signal is received by the codec 150 from an external device, the mute signal 112 can be muted until codec 150 is restarted and an analog output signal 142 is again produced. In addition, if output module experiences an error condition such as by losing lock on the conversion of digital input signal 138, mute signal 112 can be asserted while this problem persists.

Additional functions and features of the present invention including additional embodiments are presented in conjunction with FIGS. 5-19 that follow.

Figure 4:
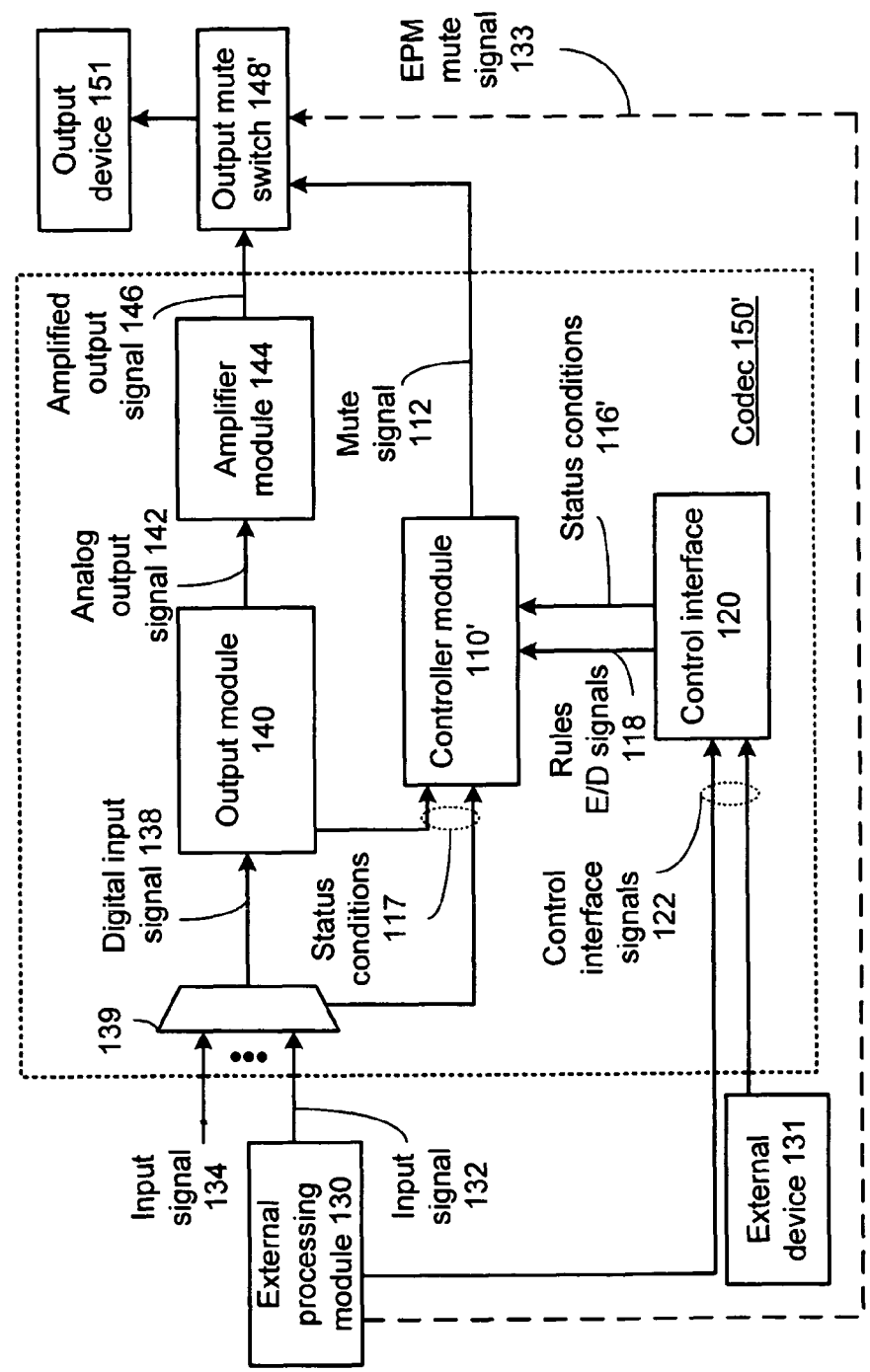
FIG. 4 presents a block diagram representation of a codec in accordance with an embodiment of the present invention.

FIG. 4 presents a block diagram representation of a codec in accordance with an embodiment of the present invention. A codec 150' is presented that includes many common elements of codec 150 that are referred to by common reference numerals. In addition, controller module 110' and output switch 148' can be implemented similarly to their counterparts described in association with FIG. 3, but modified as described herein. Further, codec 150' can be used in any of the variety of electronic devices described in association with FIGS. 1 and 2.

In particular, codec 150' includes a control interface 120 for receiving control interface signals 122 from external devices such as external processing module 130 that supplies an input signal 132 or other external device 131. In an embodiment of the present invention control interface signals 122 are formatted in accordance with an I²C protocol, however other interface protocols and formats could likewise be used.

A multiplexer module 139 is included for switching the source of the digital input signal 138 from a plurality of input signals, including input signal 132 and input signal 134, that can be in the same format, however, in an embodiment of the present invention are in different formats. Amplifier module 144 is operatively coupled to the output module 140 for producing an amplified output signal 146 for an output device 151 from the analog output signal 142. Output mute switch 148' disconnects the amplified output signal 146 from the output device 151 when the mute signal 122 is asserted. In addition, output mute switch 148' can be optionally engaged independently by external processing module 130 to disconnect amplified output signal 146 from output device 151 in response to external processing device (EPD) mute signal 133.

Controller module 110' receives status conditions 116' from control interface 120. Such status conditions 116' include an external mute signal and a reset signal that each can be asserted or deasserted and an input format signal that represents the current format of input signal 132. Controller 110' is operable to monitor these status conditions 116' and includes a plurality of disconnect rules for asserting mute signal 112, such as the rules set forth in the table below.

| Rule No. | Rule |
| --- | --- |
| 1 | assert the mute signal 112 when the external mute signal is asserted |
| 2 | assert the mute signal 112 when the reset signal is asserted |

-continued

| Rule No. | Rule |
|---|---|
| 3 | assert the mute signal 112 when the input format is changed |

In this fashion, the output to output device 151 can be muted in response to a request from external processing module 130 or other external device 131, for instance when an error condition is detected by one of these devices, the codec is commanded to reset or when the format of the input signal is changed, etc.

In addition to status conditions 116' that are received via control interface 120 from external devices, controller module 110' monitors a plurality of status conditions 117 that a can be generated internally by codec 150'. In particular, status conditions 117 include an input source signal that is either received from multiplexer module 139, from some other device that controls the selection of the source of digital input signal 138 or from controller module 110' itself—if controller module 110' is operable to perform this function in additional to the other functions described in accordance with the present invention. In addition, status conditions 117 include a lock signal from output module 140 that is asserted when the output module is locked on the digital input signal 138 and is deasserted when the output module loses lock on the digital input signal. Further, status conditions 117 include signals indicating the analog power level of an analog portion of output module 140 and a digital power level of a digital portion of output module 140.

Controller 110' further is operable to monitor status conditions 117 and includes a plurality of disconnect rules for asserting mute signal 112, such as the rules set forth in the table below.

| Rule No. | Rule |
|---|---|
| 4 | assert the mute signal 112 when the digital power level compares unfavorably to a digital power level threshold |
| 5 | assert the mute signal 112 when the analog power level compares unfavorably to an analog power level threshold. |
| 6 | assert the mute signal 112 when the source of the digital input signal is switched |
| 7 | assert the mute signal 112 when the lock signal is deasserted |

In an embodiment of the present invention, controller module 110 is further operable top receive, via control interface signals 122 and control interface 120, rules enable/disable signals 118 from external processing module 130 for selectively enabling or disabling one or more of the disconnect rules. The particular disconnect rules that are in use at any given time are established based on the rules enable/disable signal 118. In an embodiment of the present invention, controller module 110' automatically enables each of the disconnect rules and selectively disables selected disconnect rules in response to the rules enable/disable signal 118. In an alternative embodiment of the present invention, controller module 110' automatically disables each of the disconnect rules and selectively enables selected disconnect rules in response to the rules enable/disable signal 118.

In this fashion, external processing module 130 can provide some control over the configuration of codec 150. For example, when external processing module 130 is configured to provide external processor module mute signal 133 to separately engage output switch module 148', the external processing module may chose to disable Rule No. 1 that serves to command the codec 150' to engage the output switch module 148' itself. In this and other scenarios, external processing module 130 may choose to assume greater control of the muting process by disabling additional rules, either permanently or on a temporary basis.

Figure 5:
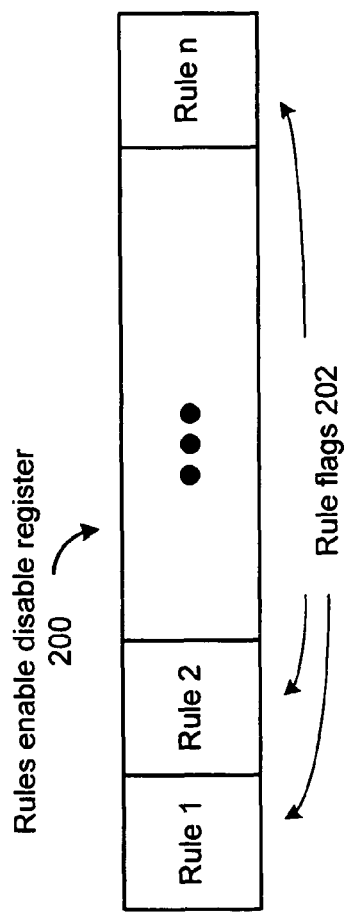
FIG. 5 presents a pictorial representation of a rules enable/disable register in accordance with an embodiment of the present invention.

FIG. 5 presents a pictorial representation of a rules enable/disable register in accordance with an embodiment of the present invention. In particular, rules enable/disable register 200 is presented that can be implemented in a memory that is internal to controller module 110' or otherwise coupled to controller module 110'. Rules enable/disable register 200 includes a plurality of rule flags 202 that are asserted when a particular rule is enabled and deasserted when a particular rule is deasserted. In an embodiment of the present invention, controller 110' monitors particular conditions 116' and 117, only to the extent that the rules flag corresponding to these particular conditions are asserted (representing that the corresponding rules are enabled).

Figure 6:
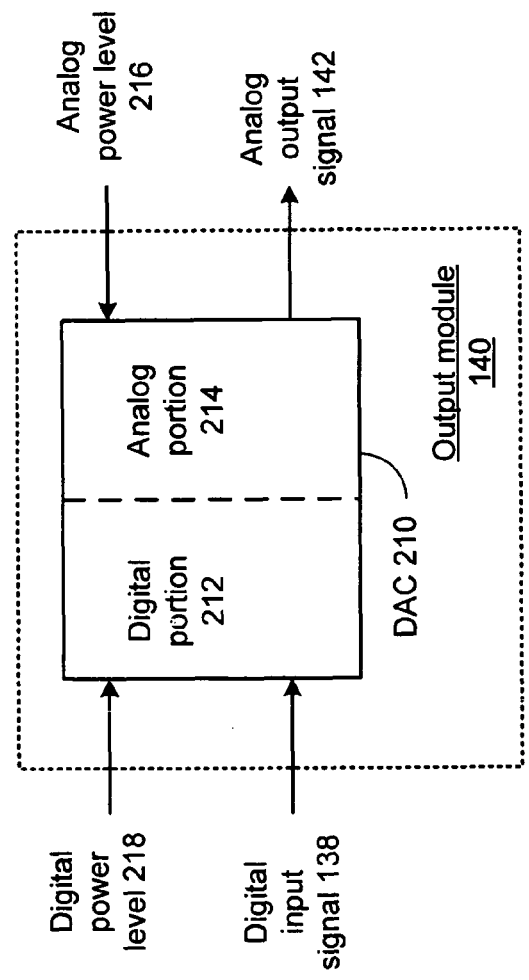
FIG. 6 presents a block diagram representation of an output module in accordance with an embodiment of the present invention.

FIG. 6 presents a block diagram representation of an output module in accordance with an embodiment of the present invention. In particular, output module 140 includes a digital to analog converter (DAC) 210 that includes a digital portion 212 powered by digital power level 218 and an analog portion 214 powered by analog power level 216. Depending on the implementation of DAC 210, a drop in digital power level 218 may or may not be cause to mute the output. A drop in analog power level 216, such as a drop below an amount necessary to process a full output swing of analog output signal 242 or a drop that otherwise impairs the functionality of analog portion 214, could result in undesirable distortion that can be muted to avoid the reproduction of a distorted output to the user. In an embodiment of the present invention, a drop in power level may be caused by a low power condition in a battery or other power source. In a further embodiment, a drop in power level may occur in response to a power management command that places the device in a low-power state.

Figure 7:
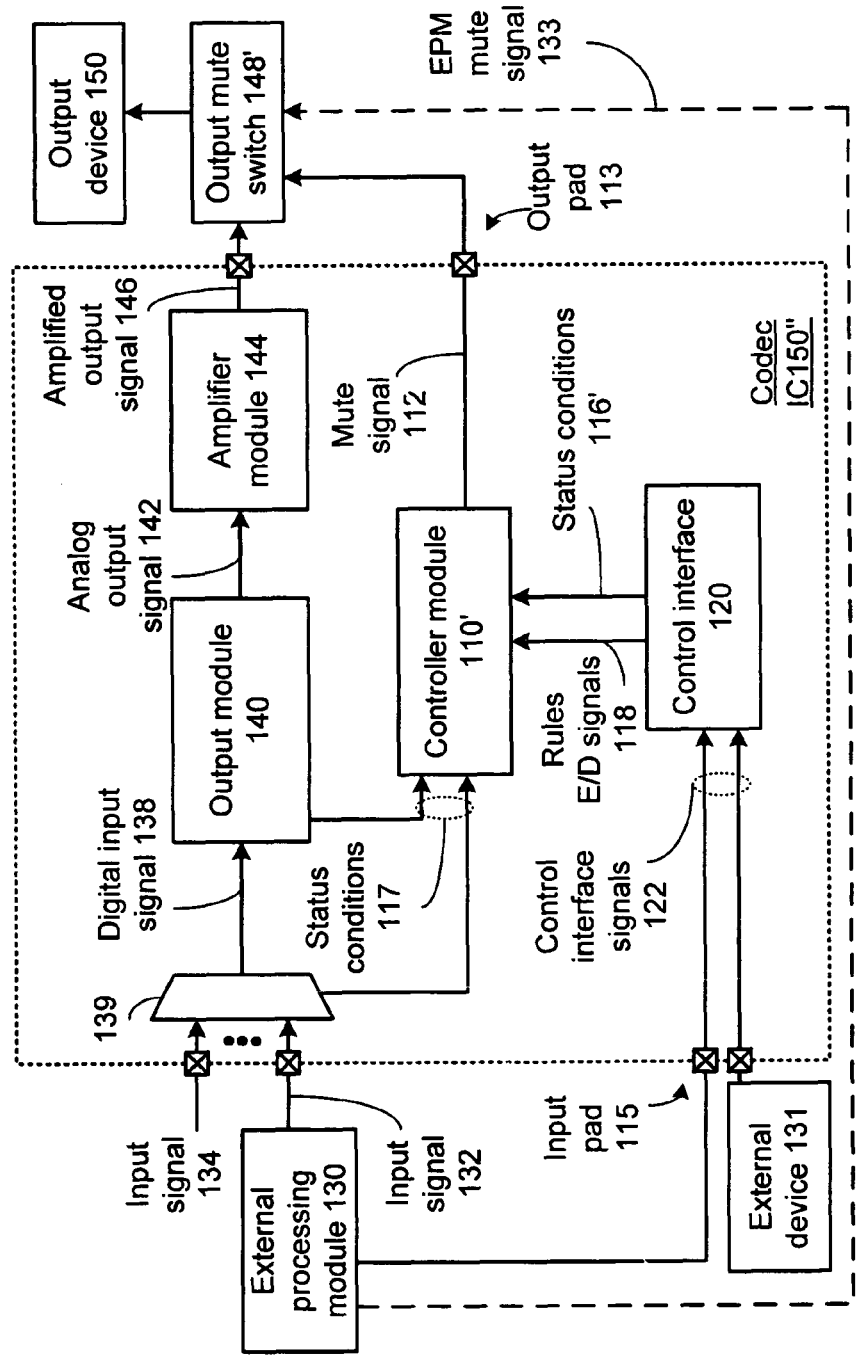
FIG. 7 presents a block diagram representation of a codec in accordance with an embodiment of the present invention.

FIG. 7 presents a block diagram representation of a codec in accordance with an embodiment of the present invention. A codec integrated circuit (IC) 150" is presented that includes many common elements of codecs 150 and 150' that are referred to by common reference numerals. In this embodiment, control interface 120, controller module 110', multiplexer module 139, output module 140 and amplifier module 144 are implemented on an integrated circuit that includes pads, such as input pad 115 and output pad 113 to and from the integrated circuit. Like codecs 150 and 150', codec IC 150" can be used in any of the variety of electronic devices described in association with FIGS. 1 and 2. It should be noted that various circuit modules of codec 150, 150' and codec IC 150" can process signals in either a single-ended or differential configuration. For example, amplifier 144 can be implemented with either a differential output or a single-ended output in the various embodiments of the present invention.

In this embodiment, output pad 113 couples a mute signal, such as mute signal 112 to output mute switch 148' that is external to the codec IC 150". Input pad 115 receives a rules enable signal, such as rules enable/disable signal 118 as part of control interface signals 122.

While a particular embodiment of codec IC 150" is presented, in an alternative embodiment of the present invention, additional modules and devices, such as output mute switch 148' and external processing module 130, and optionally other devices and modules not expressly shown, may be likewise can be incorporated in a single integrated circuit. Alternatively, codecs 150, 150' and codec IC 150" can be implemented with multiple integrated circuits. For instance, in an embodiment of the present invention, control interface 120, controller module 110', multiplexer module 139, and output module 140 are implemented on a single integrated circuit with output pad 113 and input pad 115, while amplifier module 144 is included in a separate integrated circuit, coupled to output module 140 via a separate output pad, not expressly shown.

In an embodiment of the present invention, output module 140 includes a plurality of digital to analog converter modules, such as DAC 210, to process a plurality of digital input signals 138 into a plurality of analog output signals 142. Output mute switch 148 and/or 148' is coupled to a plurality of output devices 151 and includes a plurality of mute devices. In an embodiment, the plurality of mute devices are selectively engaged by mute signal 112 that includes either a single mute signal for muting all the mute devices or a plurality of individual mute signals for selectively engaging individual mute devices of output mute switch 148 and/or 148'.

In particular, in an embodiment wherein mute signal 112 includes a plurality of individual mute signals for selectively engaging individual mute devices, some of the plurality of disconnect rules, such as Rule No. 2 corresponding to a codec reset signal, can cause controller module 110' to issue individual mute signals for all of the individual mute devices. On the other hand, other disconnect rules and their corresponding status conditions 116' and/or 117 can be monitored and applied on an individual basis. For instance, when a particular DAC 210 loses lock, the individual mute device corresponding to the output of that particular DAC 210 can be engaged, while the other output mute switches are allowed to pass the remaining outputs, unaltered, to their corresponding output devices 151.

FIG. 8 presents a flowchart representation of a method in accordance with the present invention. In particular, a method is presented for use in conjunction with one or more of the functions and features presented in association with FIGS. 1-7. In step 400, a digital input signal is converted into an analog output signal. In step 402, a plurality of status conditions are monitored in a codec. In step 404, a mute signal is asserted for engaging an output mute switch based on a plurality of disconnect rules. In an embodiment of the present invention, the digital input signal is one of: an audio signal, and a video signal.

In an embodiment of the present invention, the plurality of conditions includes at least one condition received from an external device and at least one condition generated internally. In an embodiment, the mute signal includes a plurality of individual mute signals and output mute switch includes a plurality of mute devices and wherein the plurality of individual mute signals are asserted in response to at least one of the plurality of disconnect rules. Further, in an embodiment, only one of individual mute signals are asserted in response to at least one of the plurality of disconnect rules.

Figure 9:
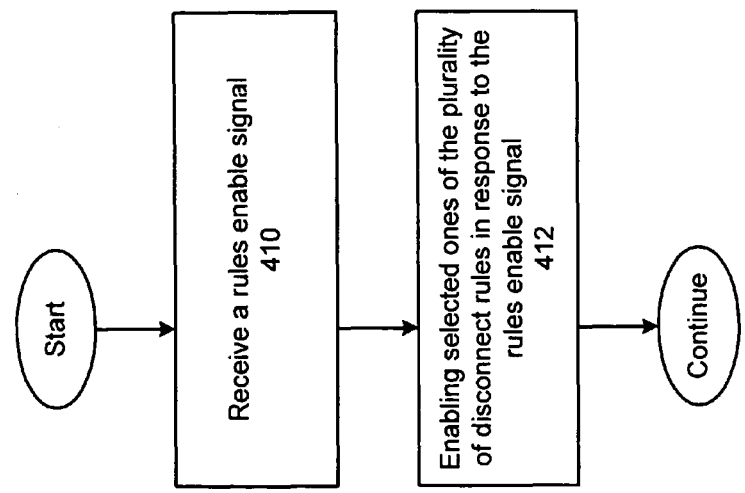
FIG. 9 presents a flowchart representation of a method in accordance with the present invention.

FIG. 9 presents a flowchart representation of a method in accordance with the present invention. A method is presented for use in conjunction with one or more of the functions and features presented in association with FIGS. 1-7, and the method presented in conjunction with FIG. 8. In step 410, a rules enable signal is received. In step 412, selected ones of the plurality of disconnect rules are enabled in response to the rules enable signal.

Figure 10:
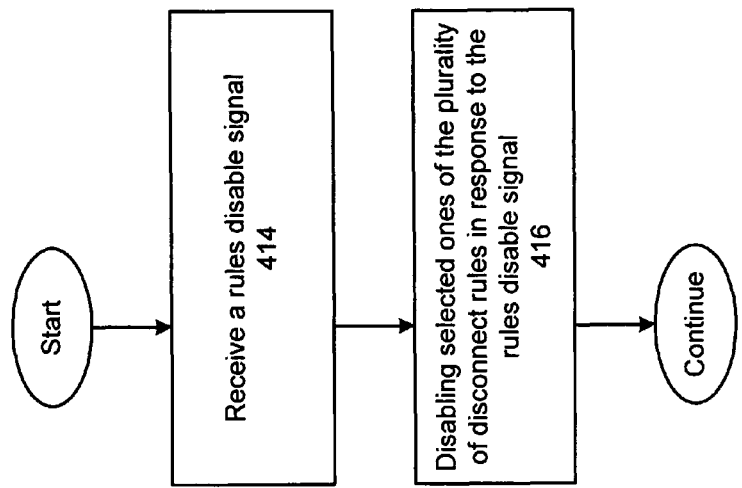
FIG. 10 presents a flowchart representation of a method in accordance with the present invention.

FIG. 10 presents a flowchart representation of a method in accordance with the present invention. A method is presented for use in conjunction with one or more of the functions and features presented in association with FIGS. 1-7, and the methods presented in conjunction with FIGS. 8-9. In step 414, a rules disable signal is received. In step 416, selected ones of the plurality of disconnect rules are disabled in response to the rules disable signal.

Figure 11:
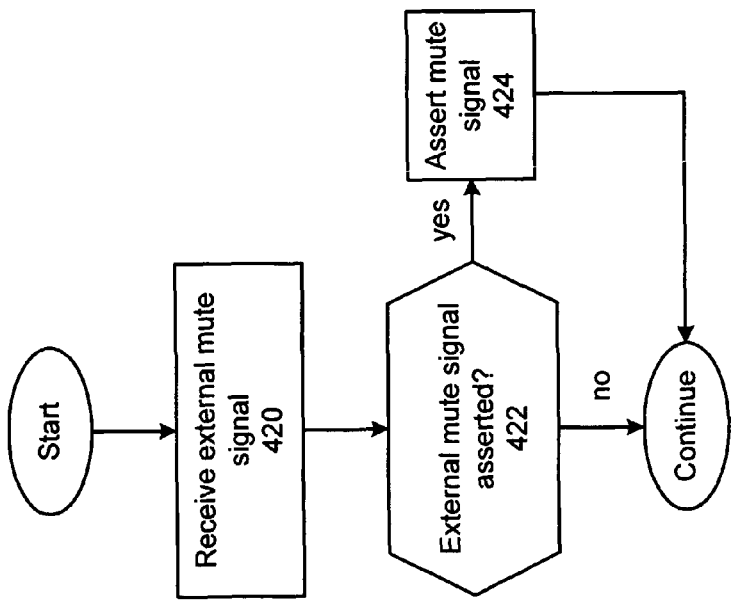
FIG. 11 presents a flowchart representation of a method in accordance with the present invention.

FIG. 11 presents a flowchart representation of a method in accordance with the present invention. A method is presented for use in conjunction with one or more of the functions and features presented in association with FIGS. 1-7, and the methods presented in conjunction with FIGS. 8-10. In step 420, an external mute signal is received. In step 422, the method determines if the external mute signal is asserted or deasserted. In step 424 the mute signal is asserted when the external mute signal is asserted.

Figure 12:
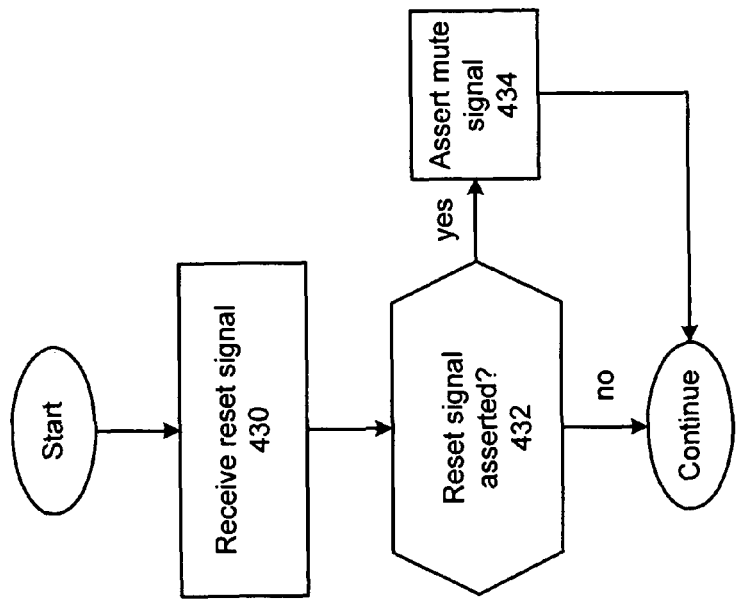
FIG. 12 presents a flowchart representation of a method in accordance with the present invention.

FIG. 12 presents a flowchart representation of a method in accordance with the present invention. A method is presented for use in conjunction with one or more of the functions and features presented in association with FIGS. 1-7, and the methods presented in conjunction with FIGS. 8-11. In step 430, a reset signal is received. In step 432, the method determines if the reset signal is asserted or deasserted. In step 434 the mute signal is asserted when the reset signal is asserted.

Figure 13:
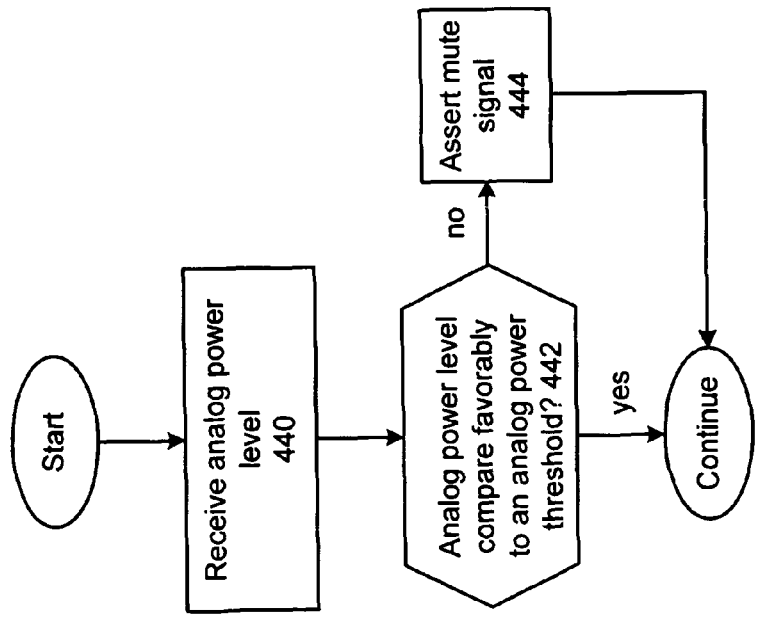
FIG. 13 presents a flowchart representation of a method in accordance with the present invention.

FIG. 13 presents a flowchart representation of a method in accordance with the present invention. A method is presented for use in conjunction with one or more of the functions and features presented in association with FIGS. 1-7, and the methods presented in conjunction with FIGS. 8-12. In step 440 an analog power level is received, corresponding to an analog portion of an analog to digital converter. In step 442, the analog power-level is compared to an analog power threshold. In step 444, the mute signal is asserted when the analog power level compares unfavorably to an analog power level threshold.

Figure 14:
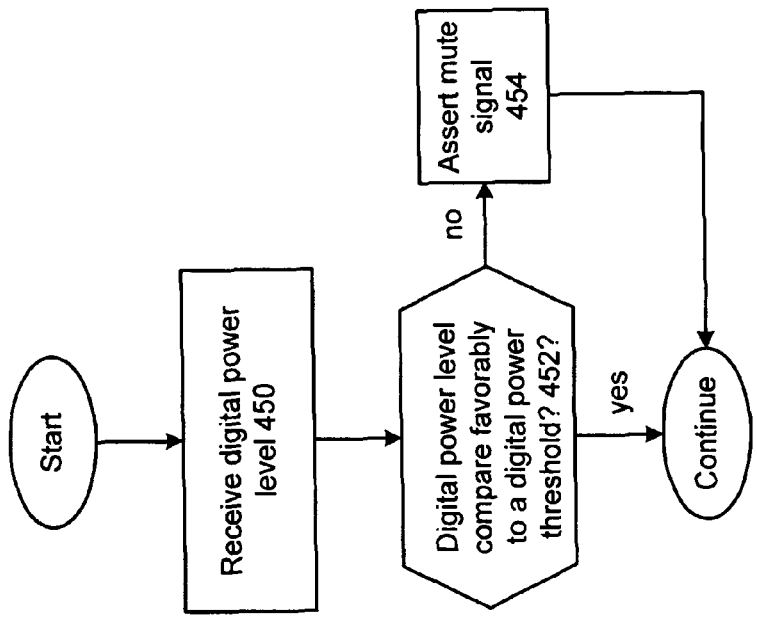
FIG. 14 presents a flowchart representation of a method in accordance with the present invention.

FIG. 14 presents a flowchart representation of a method in accordance with the present invention. A method is presented for use in conjunction with one or more of the functions and features presented in association with FIGS. 1-7, and the methods presented in conjunction with FIGS. 8-13. In step 450 a digital power level is received, corresponding to a digital portion of an analog to digital converter. In step 452, the digital power level is compared to a digital power threshold. In step 454, the mute signal is asserted when the digital power level compares unfavorably to the digital power level threshold.

Figure 15:
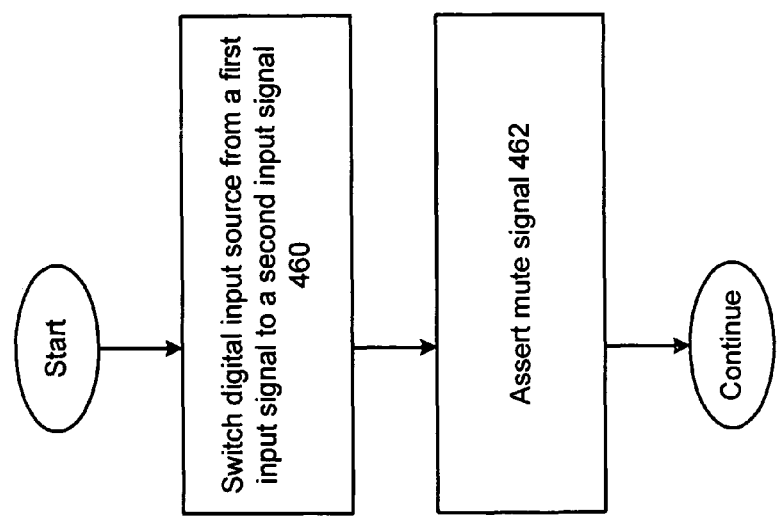
FIG. 15 presents a flowchart representation of a method in accordance with the present invention.

FIG. 15 presents a flowchart representation of a method in accordance with the present invention. A method is presented for use in conjunction with one or more of the functions and features presented in association with FIGS. 1-7, and the methods presented in conjunction with FIGS. 8-14. In step 460, a source of the digital input signal is switched from a first input signal to a second input signal. In step 462, the mute signal is asserted when the source of the digital input signal is switched.

Figure 16:
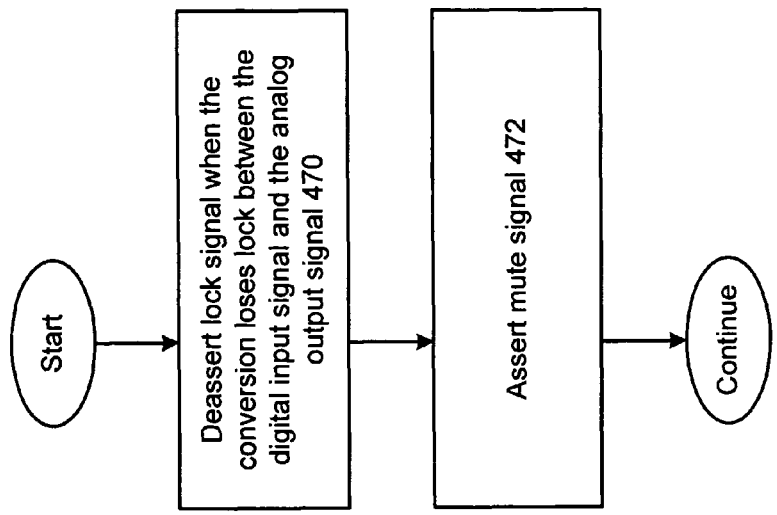
FIG. 16 presents a flowchart representation of a method in accordance with the present invention.

FIG. 16 presents a flowchart representation of a method in accordance with the present invention. A method is presented for use in conjunction with one or more of the functions and features presented in association with FIGS. 1-7, and the methods presented in conjunction with FIGS. 8-15. In step 470, a lock signal is deasserted when a digital to analog conversion, such as the conversion described in step 400 of FIG. 8, loses lock between the digital input signal and the analog output signal. In step 462, the mute signal is asserted when the lock signal is deasserted.

Figure 17:
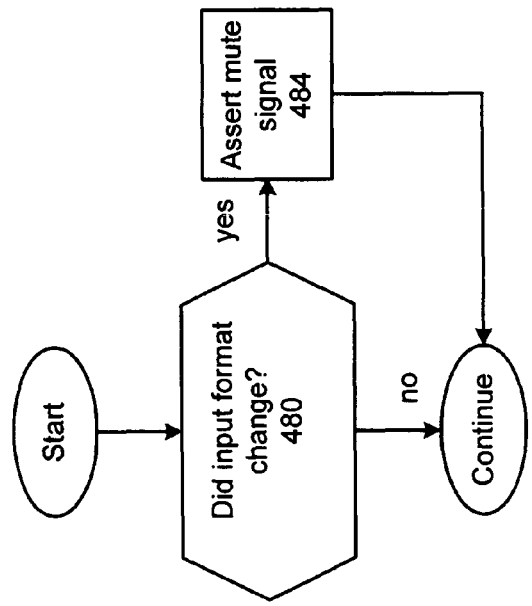
FIG. 17 presents a flowchart representation of a method in accordance with the present invention.

FIG. 17 presents a flowchart representation of a method in accordance with the present invention. A method is presented for use in conjunction with one or more of the functions and features presented in association with FIGS. 1-7, and the methods presented in conjunction with FIGS. 8-16. In step 480, the method determines a change in the input format of a digital input signal. In step 484, the mute signal is asserted when the input format is changed.

Figure 18:
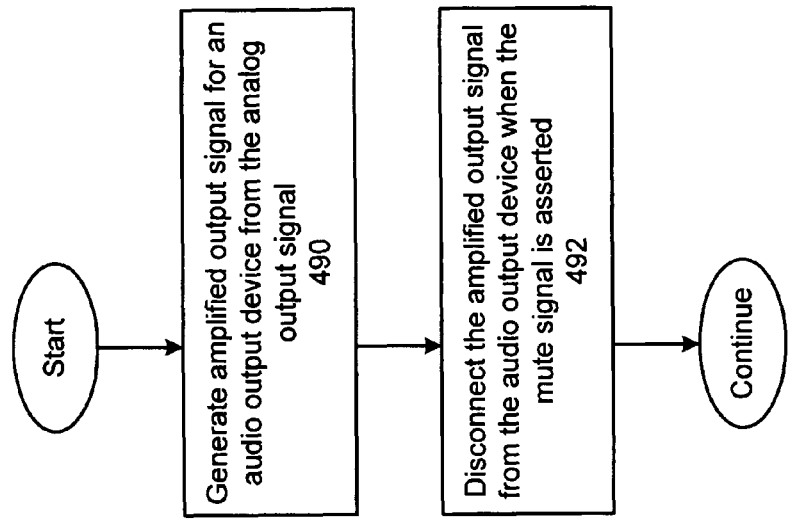
FIG. 18 presents a flowchart representation of a method in accordance with the present invention.

FIG. 18 presents a flowchart representation of a method in accordance with the present invention. A method is presented for use in conjunction with one or more of the functions and features presented in association with FIGS. 1-7, and the methods presented in conjunction with FIGS. 8-17. In step 490, an amplified output signal is generated for an audio output device from an analog output signal. In step 492, the amplified output signal is disconnected from the audio output device when the mute signal is asserted.

Figure 19:
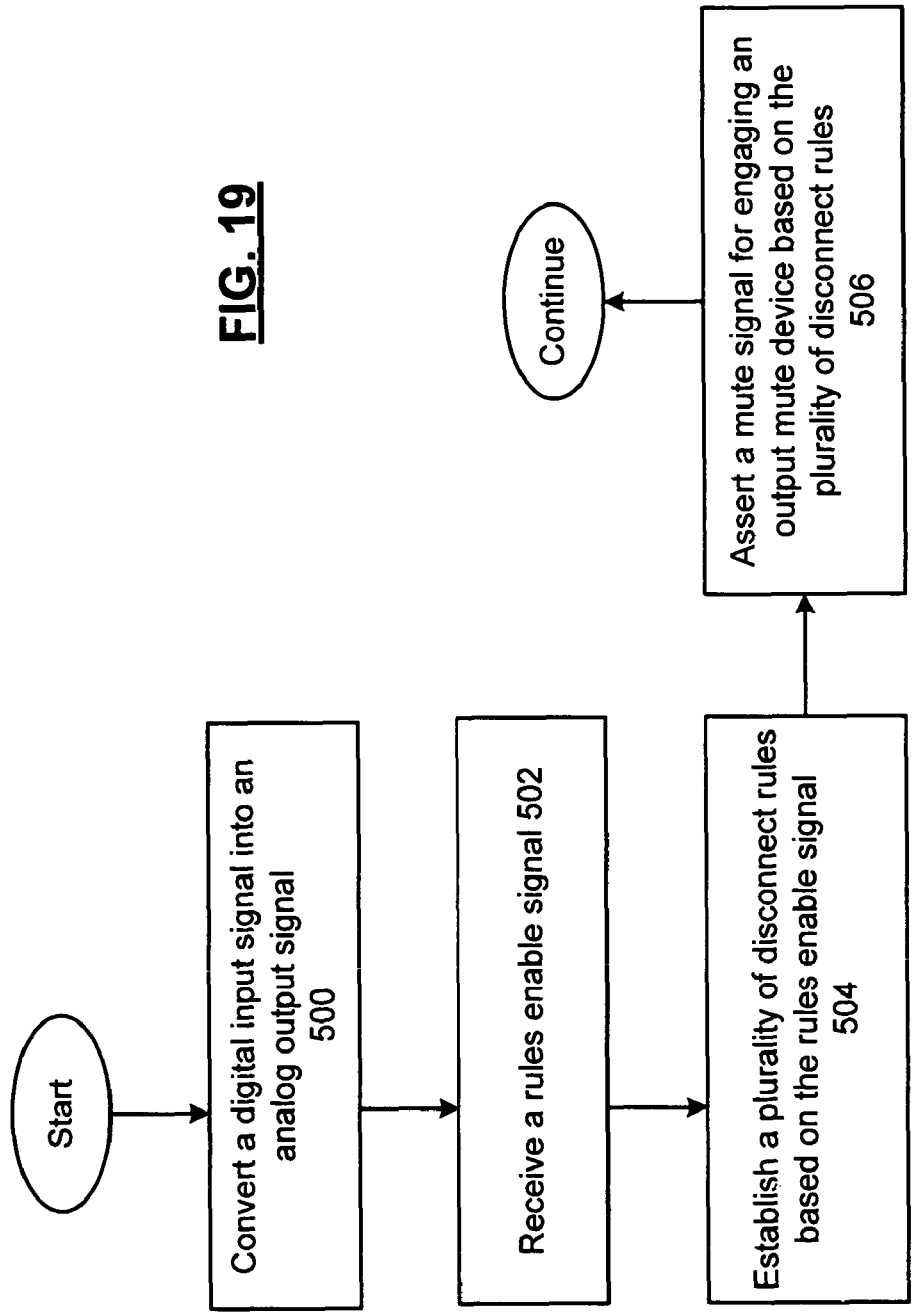
FIG. 19 presents a flowchart representation of a method in accordance with the present invention.

FIG. 19 presents a flowchart representation of a method in accordance with the present invention. A method is presented for use in conjunction with one or more of the functions and features presented in association with FIGS. 1-18. In step 500, a digital input signal is converted into an analog output signal. In step 502, a rules enable signal is received. In step 504, a plurality of disconnect rules are established based on the rules enable signal. In step 506, a mute signal is asserted for engaging an output mute device based on the plurality of disconnect rules.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.35 micron or smaller CMOS technology. Provided however that other circuit technologies including other transistor, diode and resistive logic, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a codec and Codec integrated circuit. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A codec comprising:
an output module for converting a digital input signal into an analog output signal;
a control interface, operatively coupled to the controller module, for receiving a rules enable signal and for selectively enabling or disabling selected ones of a plurality of disconnect rules in response to the rules enable signal, the plurality of disconnect rules comprising a first disconnect rule;
a controller module, operatively coupled to the output module, for monitoring a plurality of status conditions and to:
when the first disconnect rule is enabled, setting an output mute switch to mute an audio output in response to determining that the first condition is met;
when the first disconnect rule is enabled, setting the output mute switch such that the audio output is not muted in response to determining that the first condition is not met; and
when the first disconnect rule is disabled, setting the output mute switch such that the audio output is not muted both when the first condition is met and when the first condition is not met.

2. The codec of claim 1 wherein:
the control interface further is for receiving an external mute signal that can be asserted or deasserted;
wherein the first condition is based on the external mute signal, and wherein the first disconnect rule includes assert the mute signal when the external mute signal is asserted.

3. The codec of claim 1 wherein:
the control interface further is for receiving a reset signal that can be asserted or deasserted;
wherein the first condition is based on the reset signal, and wherein the first disconnect rule includes assert the mute signal when the reset signal is asserted.

4. The codec of claim 1 further comprising:
a multiplexer module for switching a source of the digital input signal from a first input signal to a second input signal;
wherein the first condition is based on the source of the digital input signal, and wherein the first disconnect rule includes assert the mute signal when the source of the digital input signal is switched.

5. The codec of claim 1 wherein the digital input signal includes an input format, wherein the first condition is based on the input format, and wherein the first disconnect rule includes assert the mute signal when the input format is changed.

6. The codec of claim 1 wherein the output module generates a lock signal that is asserted when the output module is locked on the digital input signal and is deasserted when the output module loses lock on the digital input signal, wherein the first condition is based on the lock signal, and wherein the first disconnect rule includes assert the mute signal when the lock signal is deasserted.

7. The codec of claim 1 wherein the output module includes a digital to analog converter having an analog portion that is powered by a power source having an analog power level, wherein the first condition is based on the analog power level, and wherein the first disconnect rule includes assert the mute signal when the analog power level compares unfavorably to an analog power level threshold.

8. The codec of claim 1 wherein the output module includes a digital to analog converter having a digital portion that is powered by a power source having a digital power level, wherein the first condition is based on the digital power level, and wherein the first disconnect rule includes assert the mute signal when the digital power level compares unfavorably to a digital power level threshold.

9. The codec of claim 1 further comprising:
an amplifier module, operatively coupled to the output module, for producing an amplified output signal for an audio output device from the analog output signal;
wherein the output mute switch disconnects the amplified output signal from the audio output device when the mute signal is asserted.

10. The codec of claim 1 wherein the digital input signal is one of: an audio signal, and a video signal.

11. The codec of claim 1 wherein the output mute switch may further be engaged by an external processing module.

12. The codec of claim 1 wherein the first condition is received from an external device.

13. The codec of claim 1 wherein the mute signal includes a plurality of individual mute signals and the output mute switch includes a plurality of mute devices and wherein the plurality of individual mute signals are asserted in response to the first disconnect rule.

14. The codec of claim 1 wherein the mute signal includes a plurality of individual mute signals and the output mute switch includes a plurality of mute devices and wherein only one of individual mute signals are asserted in response to the first disconnect rule.

15. A codec integrated circuit comprising:
an output module for converting a digital input signal into an analog output signal;
an output pad for coupling a mute signal to an output mute switch that is external to the codec integrated circuit;
a control interface, operatively coupled to the controller module, for receiving a rules enable signal; and
a controller module, operatively coupled to the output module and the output pad, for monitoring a plurality of status conditions including a first condition, for selectively enabling or disabling selected ones of a plurality of disconnect rules in response to the rules enable signal, the plurality of disconnect rules comprising a first disconnect rule, the controller module to:
when the first disconnect rule is enabled, setting an output mute switch to mute an audio output in response to determining that the first condition is met;
when the first disconnect rule is enabled, setting the output mute switch such that the audio output is not muted in response to determining that the first condition is not met; and
when the first disconnect rule is disabled, setting the output mute switch such that the audio output is not muted both when the first condition is met and when the first condition is not met.

16. The codec integrated circuit of claim 15 wherein:
the control interface further is for receiving an external mute signal that can be asserted or deasserted;
wherein the first condition includes the external mute signal, and wherein the first disconnect rule includes assert the mute signal when the external mute signal is asserted.

17. The codec integrated circuit of claim 15 wherein:
the control interface further is for receiving a reset signal that can be asserted or deasserted;
wherein the first condition includes the reset signal, and the first disconnect rule includes assert the mute signal when the reset signal is asserted.

18. The codec integrated circuit of claim 15 further comprising:
a multiplexer module for switching a source of the digital input signal from a first input signal to a second input signal;
wherein the first condition includes the source of the digital input signal, and wherein the first disconnect rule includes assert the mute signal when the source of the digital input signal is switched.

19. The codec integrated circuit of claim 15 wherein the digital input signal includes an input format, wherein the first condition includes the input format, and wherein the first disconnect rule includes assert the mute signal when the input format is changed.

20. The codec integrated circuit of claim 15 wherein the output module generates a lock signal having a lock signal that is asserted when the output module is locked on the digital input signal and is deasserted when the output module loses lock on the digital input signal, wherein the first condition includes the lock signal, and wherein the first disconnect rule includes assert the mute signal when the lock signal is deasserted.

21. The codec integrated circuit of claim 15 wherein the output module includes a digital to analog converter having an analog portion that is powered by a power source having an analog power level, wherein the first condition includes the analog power level, and wherein the first disconnect rule includes assert the mute signal when the analog power level compares unfavorably to an analog power level threshold.

22. The codec integrated circuit of claim 15 wherein the output module includes a digital to analog converter having a digital portion that is powered by a power source having a digital power level, wherein the first condition includes the digital power level, and wherein the first disconnect rule includes assert the mute signal when the digital power level compares unfavorably to a digital power level threshold.

23. The codec integrated circuit of claim 15 further comprising:
an amplifier module, operatively coupled to the output module, for producing an amplified output signal for an audio output device from the analog output signal;
wherein the output mute switch disconnects the amplified output signal from the audio output device when the mute signal is asserted.

24. The codec integrated circuit of claim 15 wherein the digital input signal is one of:
an audio signal, and a video signal.

25. The codec integrated circuit of claim 15 wherein the the first condition is received from an external device.

26. The codec integrated circuit of claim 15 wherein the mute signal includes a plurality of individual mute signals and the output mute switch includes a plurality of mute devices and wherein the plurality of individual mute signals are asserted in response to at least one of the plurality of disconnect rules.

27. The codec integrated circuit of claim 15 wherein the mute signal includes a plurality of individual mute signals and the output mute switch includes a plurality of mute devices and wherein only one of individual mute signals are asserted in response to at least one of the plurality of disconnect rules.

28. A method comprising:
converting a digital input signal into an analog output signal;
monitoring a plurality of status conditions in a codec, the plurality of status conditions comprising a first condition;
receiving a rules enable signal;
selectively enabling or disabling selected ones of a plurality of disconnect rules in response to the rules enable signal, the plurality of disconnect rules comprising a first disconnect rule;
when the first disconnect rule is enabled, setting an output mute switch to mute an audio output in response to determining that the first condition is met;
when the first disconnect rule is enabled, setting the output mute switch such that the audio output is not muted in response to determining that the first condition is not met; and
when the first disconnect rule is disabled, setting the output mute switch such that the audio output is not muted both when the first condition is met and when the first condition is not met.

29. The method of claim 28 wherein the first condition is based on an external mute signal.

30. The method of claim 28 wherein the first condition is based on a reset signal.

31. The method of claim 28 further comprising:
wherein the first condition is based on switching a source of a digital input signal.

32. The method of claim 28 wherein the digital input signal includes an input format and the first condition is based on a change in the input format.

33. The method of claim 28 wherein the first condition is based on losing a lock between the digital input signal and the analog output signal.

34. The method of claim 28 wherein the first condition is based on the relationship between a threshold and an analog power level of an analog portion of an analog to digital converter.

35. The method of claim 28 wherein the first condition is based on the relationship between a threshold and an digital power level of a digital portion of an analog to digital converter.

36. The method of claim 28 further comprising:
generating an amplified output signal for an audio output device from the analog output signal; and
disconnecting the amplified output signal from the audio output device when the mute signal is asserted.

37. The method of claim 28 wherein the digital input signal is one of: an audio signal, and a video signal.

38. The method of claim 28 wherein the plurality of conditions includes at least one condition received from an external device and at least one condition generated internally.

39. The method of claim 28 wherein the mute signal includes a plurality of individual mute signals and output mute switch includes a plurality of mute devices and wherein the plurality of individual mute signals are asserted in response to at least one of the plurality of disconnect rules.

40. The method of claim 28 wherein the mute signal includes a plurality of individual mute signals and output mute switch includes a plurality of mute devices and wherein only one of individual mute signals are asserted in response to at least one of the plurality of disconnect rules.

41. A codec integrated circuit comprising:
an output module for converting a digital input signal into an analog output signal;
an input pad for receiving a rules enable signal;
a controller module, operatively coupled to the output module and the input pad, for selectively enabling or disabling selected ones of a plurality of disconnect rules based on the rules enable signal, and for asserting a mute signal for engaging an output mute device based on enabled ones of the plurality of disconnect rules and a plurality of conditions comprising a first condition, the plurality of disconnect rules comprising a first disconnect rule, the controller module to:
when the first disconnect rule is enabled, setting an output mute switch to mute an audio output in response to determining that the first condition is met;
when the first disconnect rule is enabled, setting the output mute switch such that the audio output is not muted in response to determining that the first condition is not met; and
when the first disconnect rule is disabled, setting the output mute switch such that the audio output is not muted both when the first condition is met and when the first condition is not met.

42. A codec comprising:
an output module for converting a digital input signal into an analog output signal;
a controller module, operatively coupled to the output module, for monitoring a plurality of status conditions comprising a first condition and for asserting a mute signal for engaging an output mute switch based on a plurality of disconnect rules comprising a first disconnect rule, the controller module to:
when the first disconnect rule is enabled, setting an output mute switch to mute an audio output in response to determining that the first condition is met;
when the first disconnect rule is enabled, setting the output mute switch such that the audio output is not muted in response to determining that the first condition is not met; and
when the first disconnect rule is disabled, setting the output mute switch such that the audio output is not muted both when the first condition is met and when the first condition is not met; and
a multiplexer module for switching a source of the digital input signal from a first input signal to a second input signal;
wherein one of the plurality of status conditions includes the source of the digital input signal, and wherein one of the plurality of disconnect rules includes assert the mute signal when the source of the digital input signal is switched.

* * * * *